(12) United States Patent
Koesters et al.

(10) Patent No.: US 9,757,885 B2
(45) Date of Patent: Sep. 12, 2017

(54) PROCESS FOR PRODUCING COMPOSITE PROFILES

(71) Applicant: BASF SE, Ludwigshafen (DE)

(72) Inventors: Michael Koesters, Lotte (DE);
Gianpaolo Tomasi, Diepholz (DE);
Lars Schoen, Osnabrueck (DE);
Ludwig Windeler, Marl (DE)

(73) Assignee: BASF SE, Ludwigshafen (DE)

( * ) Notice: Subject to any disclaimer, the term of this patent is extended or adjusted under 35 U.S.C. 154(b) by 662 days.

(21) Appl. No.: 14/034,775

(22) Filed: Sep. 24, 2013

(65) Prior Publication Data

US 2014/0093675 A1 Apr. 3, 2014

Related U.S. Application Data

(60) Provisional application No. 61/706,788, filed on Sep. 28, 2012.

(51) Int. Cl.
| | | |
|---|---|---|
| *B29C 44/12* | (2006.01) | |
| *E06B 1/32* | (2006.01) | |
| *E06B 3/263* | (2006.01) | |
| *E06B 3/267* | (2006.01) | |

(52) U.S. Cl.
CPC .......... *B29C 44/1276* (2013.01); *E06B 1/325* (2013.01); *E06B 3/267* (2013.01); *E06B 3/26303* (2013.01); *Y10T 428/233* (2015.01)

(58) Field of Classification Search
CPC .............. B29C 44/1276; B29C 44/129; B29C 44/1295; B29C 44/18; B29C 44/19; B29C 44/1219; B29C 44/1223; B29C 44/1228; B29C 44/1233; B29C 44/1238; B29C 44/12
See application file for complete search history.

(56) References Cited

U.S. PATENT DOCUMENTS

| 5,478,494 A * | 12/1995 | Lee ...................... C08G 18/089 |
| | | 252/182.25 |
| 2008/0188582 A1* | 8/2008 | Lehmann ............... C08G 18/10 |
| | | 521/172 |
| 2010/0080900 A1 | 4/2010 | Geraedts et al. |
| 2012/0244303 A1 | 9/2012 | Tomasi et al. |
| 2013/0048137 A1 | 2/2013 | Grieser-Schmitz et al. |

FOREIGN PATENT DOCUMENTS

| DE | 100 35 649 A1 | | 1/2002 |
| DE | EP 1925417 | * | 11/2007 |
| EP | 1 925 417 A1 | | 5/2008 |
| WO | WO 2008/104492 A2 | | 9/2008 |
| WO | WO 2012/126916 A2 | | 9/2012 |
| WO | WO 2013/030203 A2 | | 3/2013 |
| WO | WO 2013/178657 A1 | | 12/2013 |
| WO | WO 2014/005863 A2 | | 1/2014 |

OTHER PUBLICATIONS

U.S. Appl. No. 13/897,690, filed May 20, 2013, Fabisiak, et al.
U.S. Appl. No. 13/923,959, filed Jun. 21, 2013, Grieser-Schmitz, et al.
International Search Report issued Jan. 17, 2014 in PCT/EP2013/069130 (with English translation of category of cited documents).
European Search Report issued Feb. 27, 2013 in Patent Application No. 12186476.3 with English Translation of Category of Cited Documents.

\* cited by examiner

*Primary Examiner* — Stella Yi
(74) *Attorney, Agent, or Firm* — Oblon, McClelland, Maier & Neustadt, L.L.P.

(57) ABSTRACT

The present invention relates to a process for producing composite profiles comprising at least two metal shells which are joined by struts comprising a thermoplastic material and a core comprising rigid polyurethane foam, which comprises introduction of the starting components of the rigid polyurethane foam into a hollow space formed by the metal shells, with the rigid polyurethane foam being formed, and subsequent application of a surface coating to the outer surface of the composite profile by means of a powder coating or baking enamel, where the rigid polyurethane foam is obtained by reaction of the following components:
  A) at least one polyisocyanate,
  B) at least one polyfunctional compound which is reactive toward isocyanates,
  C) one or more blowing agents comprising at least formic acid,
  D) optionally one or more flame retardants,
  E) optionally one or more catalysts and
  F) optionally further auxiliaries or additives,
wherein the starting components of the rigid polyurethane foam do not comprise any inorganic fillers.

10 Claims, No Drawings

PROCESS FOR PRODUCING COMPOSITE PROFILES

The invention relates to a process for producing composite profiles comprising metal shells, struts comprising a thermoplastic material and a core comprising rigid polyurethane foam, as are used, for example, for window frames and doorframes.

Rigid polyurethane foams have been known for a long time and are widely described in the literature. They are used, for example, for thermal insulation in refrigeration appliances, for the production of composite elements, also referred to as sandwich elements, and also in building and construction.

One application of rigid polyurethane foams is the production of composite profiles which are used, in particular, for window frames or doorframes. Here, a hollow profile is produced from two metal shells, for example comprising aluminum, and two plastic struts, for example comprising polyamide, and the liquid starting components of the rigid polyurethane foam are introduced into this where they then cure to form the foam. After curing of the foam, a surface coating is applied to the composite elements. For the surface coating, it is customary to use powder coatings or baking enamels. This surface coating is carried out at high temperature, usually in the region of 200° C., which can lead to deformation of the composite elements because of gas expansion in the rigid polyurethane foam and the different thermal expansion of aluminum and rigid polyurethane foam.

Concepts for avoiding this deformation are known from the prior art.

Thus, EP-A 1925417 describes a process for producing composite profiles which are completely filled with foam and can be surface-coated at high temperatures without deformation of the composite elements occurring. However, mineral fillers have to be added here in order to counter deformation of the composite elements. In addition, the blowing agents used in the prior art have a global warming potential.

However, fillers are disadvantageous for many applications. During cutting or sawing of hollow chamber profiles completely filled with foam they sometimes lead to a great deal of dust. They cause brittleness and reductions in the flexibility, particularly in the temperature range below 0° C.

A process for producing such composite elements is described in DE-A 10035649. The problem of deformation of the profiles is solved by the hollow space between the metal shells and polyamide struts being only partly filled with polyurethane foam. However, the incomplete filling of the profiles with the polyurethane foam can lead either to a deterioration in the thermal insulation properties of the profiles or to deformation of the composite elements which have been completely filled with foam, in particular as a result of surface coating.

It was an object of the present invention to avoid the abovementioned disadvantages. In particular, a process for producing composite elements of the type mentioned at the outset which leads to profiles which do not display deformation on application of a surface coating at high temperatures and have good mechanical properties even at temperatures below 0° C. and can be cut without dust formation should be discovered.

The object is achieved according to the invention by a process for producing composite profiles comprising at least two metal shells which are joined by struts comprising a thermoplastic material and a core comprising rigid polyurethane foam, which comprises introduction of the starting components of the rigid polyurethane foam into a hollow space formed by the metal shells, with the rigid polyurethane foam being formed, and subsequent application of a surface coating to the outer surface of the composite profile by means of a powder coating or baking enamel, where the rigid polyurethane foam is obtained by reaction of the following components:

A) at least one polyisocyanate,
 B) at least one polyfunctional compound which is reactive toward isocyanates,
 C) one or more blowing agents comprising at least formic acid,
 D) optionally one or more flame retardants,
 E) optionally one or more catalysts and
 F) optionally further auxiliaries or additives, wherein the starting components of the rigid polyurethane foam do not comprise any inorganic fillers.

For the purposes of the invention, polyurethane foams are foams in accordance with DIN 7726. The rigid polyurethane foams used according to the invention have a compressive stress at 10% deformation of greater than or equal to 80 kPa, preferably greater than or equal to 150 kPa, particularly preferably greater than or equal to 180 kPa. Furthermore, the rigid polyurethane foam in accordance with DIN ISO 4590 has a proportion of closed cells of greater than 85%, preferably greater than 90%.

The metal shells used for producing the composite profiles usually consist of steel or aluminum. They are usually produced by mechanical shaping. The size of the metal shell depends on the desired size of the window frames and doorframes. The polymer struts inserted, usually made of polyamide or ASA, form a hollow space between the metal shells, into which the polyurethane foam is introduced and which is subsequently closed.

After shaping, the polyurethane foam is introduced into the composite profile. This is effected by mixing the polyisocyanates A) with the components B) to F) and then introducing the mixture into the composite profile where the components cure to form the rigid polyurethane foam. Introduction is usually carried out, as described above, by means of conventional metering devices, usually by means of mixing heads. The amount of foam should be such that the composite profile is completely filled but the pressure does not build up to such an extent that the composite profile is destroyed or deformed.

After curing of the rigid polyurethane foam, a surface coating is applied to the composite profile according to the invention. According to the invention, baking enamels or powder coatings are used for surface coating. These types of surface coating have a high scratch resistance.

Baking enamels are surface coatings which are cured at elevated temperature, preferably from 100 to 250° C.

Baking enamels are usually surface coatings based on acrylic, epoxy, phenolic, melamine, urea, silicone, polyurethane resins which are cured either alone or in combinations with one another or with a usually blocked hardener, for example blocked polyisocyanates, at elevated temperature, preferably in the range from 100 to 250° C. Curing occurs by means of crosslinking reactions brought about by activation of the double bonds present in the molecules of these compounds or by reaction of various functional groups with one another. Only in exceptional cases are dryers also added. In practice, baking enamels on the workpieces are cured in baking ovens or drying ovens of various dimensions under specific baking conditions. Infrared radiators or apparatuses operating on the basis of electromagnetic induction are sometimes used for generation of heat.

Liquid starting materials for baking enamels (hereinafter referred to as baking enamels in the interests of simplicity) can be either solvent-based or water-borne surface coating compositions, pigmented, transparent or clear coating compositions. Preferred binders in baking enamels are alkyd, polyester, acrylic or epoxy resins in combination with melamine resins, amines or polyisocyanates as crosslinkers.

The baking enamels are adjusted to the processing consistency by means of organic solvents or by means of water to which small amounts of 2-propanol, butanol or other alcohols have been added.

For the purposes of the present invention, powder coatings are pulverulent, solvent-free coating materials which give a coating after melting and optionally baking. The temperature range for processing is, as a function of the system present, from 80° C. to 250° C. They are predominantly applied in powder form to metallic substrates. Powder coatings are usually thermoset systems. The film-forming phase of the powder coatings is composed of binders, reaction partners for these binders, also referred to as hardeners, fillers, pigments and additives. The binders and hardeners used essentially determine the general properties of the powder coating and thus also its preferred field of use.

Powder coatings are usually based on epoxy resins, epoxy resin/polyester mixtures, polyesters, polyester/isocyanate mixtures and acrylates. The powder coatings produced therefrom are called epoxy resin powder coatings, epoxy resin/polyester powder coatings, polyester powder coatings, polyurethane powder coatings or acrylate powder coatings.

The composite profiles obtained according to the invention can advantageously be used for window frames or doorframes.

As regards the production of the rigid polyurethane foam and the starting compounds used for this purpose, the following details may be provided.

Component A)

For the purposes of the present invention, a polyisocyanate is an organic compound which contains at least two reactive isocyanate groups per molecule, i.e. the functionality is at least 2. If the polyisocyanates used or a mixture of a plurality of polyisocyanates do not have a uniform functionality, the weight average functionality of the component A) used is at least 2.

Possible polyisocyanates A) are the aliphatic, cycloaliphatic, araliphatic and preferably aromatic polyfunctional isocyanates known per se. Such polyfunctional isocyanates are known per se or can be produced according to methods known per se. The polyfunctional isocyanates can, in particular, also be used as mixtures, in which case the component A) comprises various polyfunctional isocyanates. Polyfunctional isocyanates which come into question as polyisocyanate have two (hereinafter referred to as diisocyanates) or more than two isocyanate groups per molecule.

Specific examples are, in particular: alkylene diisocyanates having from 4 to 12 carbon atoms in the alkylene radical, e.g. dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates such as cyclohexane 1,3- and 1,4-diisocyanate and any mixtures of these isomers, 1-isocyanato-3,3,5-trimethyl-5-isocyanatomethylcyclohexane (IPDI), hexahydrotolylene 2,4- and 2,6-diisocyanate and the corresponding isomer mixtures, dicyclohexylmethane 4,4'-, 2,2'- and 2,4'-diisocyanate and the corresponding isomer mixtures, and preferably aromatic polyisocyanates such as tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,2'-diisocyanates, polyphenylpolymethylene polyisocyanates, mixtures of diphenylmethane 4,4'-, 2,4'- and 2,2'-diisocyanates and polyphenylpolymethylene polyisocyanates (crude MDI) and mixtures of crude MDI and tolylene diisocyanates.

Particularly suitable polyisocyanates are diphenylmethane 2,2'-, 2,4'- and/or 4,4'-diisocyanate (MDI), 1,5-naphthylene diisocyanate (NDI), tolylene 2,4- and/or 2,6-diisocyanate (TDI), 3,3'-dimethyldiphenyl diisocyanate, 1,2-diphenylethane diisocyanate and/or p-phenylene diisocyanate (PPDI), trimethylene, tetramethylene, pentamethylene, hexamethylene, heptamethylene and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate and dicyclohexylmethane 4,4'-, 2,4'- and/or 2,2'-diisocyanate.

Use is frequently also made of modified polyisocyanates, i.e. products which are obtained by chemical reaction of organic polyisocyanates and have at least two reactive isocyanate groups per molecule. Particular mention may be made of polyisocyanates comprising ester, urea, biuret, allophanate, carbodiimide, isocyanurate, uretdione, carbamate and/or urethane groups.

As polyisocyanates of the component A), particular preference is given to the following embodiments:

i) polyfunctional isocyanates based on tolylene diisocyanate (TDI), in particular 2,4-TDI or 2,6-TDI or mixtures of 2,4- and 2,6-TDI;

ii) polyfunctional isocyanates based on diphenylmethane diisocyanate (MDI), in particular 2,2'-MDI or 2,4'-MDI or 4,4'-MDI or oligomeric MDI, also referred to as polyphenylpolymethylene isocyanate, or mixtures of two or three of the abovementioned diphenylmethane diisocyanates, or crude MDI which is obtained in the preparation of MDI or mixtures of at least one oligomer of MDI and at least one of the abovementioned low molecular weight MDI derivatives;

iii) mixtures of at least one aromatic isocyanate according to embodiment i) and at least one aromatic isocyanate according to embodiment ii).

As polyisocyanate, very particular preference is given to polymeric diphenylmethane diisocyanate. Polymeric diphenylmethane diisocyanate (hereinafter referred to as polymeric MDI) is a mixture of two-ring MDI and oligomeric condensation products and thus derivatives of diphenylmethane diisocyanate (MDI). The polyisocyanates can also preferably be made up of mixtures of monomeric aromatic diisocyanates and polymeric MDI.

Polymeric MDI comprises, in addition to two-ring MDI, one or more multiring condensation products of MDI having a functionality of more than 2, in particular 3, 4 or 5. Polymeric MDI is known and is frequently referred to as polyphenylpolymethylene isocyanate or as oligomeric MDI. Polymeric MDI is usually made up of a mixture of MDI-based isocyanates having various functionalities. Polymeric MDI is usually used in admixture with monomeric MDI.

The (weight average) functionality of a polyisocyanate comprising polymeric MDI can vary in the range from about 2.2 to about 5, in particular from 2.3 to 4, in particular from 2.4 to 3.5. One such mixture of MDI-based polyfunctional isocyanates having differing functionalities is, in particular, crude MDI which is obtained as intermediate in the preparation of MDI.

Polyfunctional isocyanates or mixtures of a plurality of polyfunctional isocyanates based on MDI are known and are marketed, for example, by BASF Polyurethanes GmbH under the name Lupranat®.

The functionality of the component A) is preferably at least two, in particular at least 2.2 and particularly preferably at least 2.4. The functionality of the component A) is preferably from 2.2 to 4 and particularly preferably from 2.4 to 3.

The content of isocyanate groups in the component A) is preferably from 5 to 10 mmol/g, in particular from 6 to 9 mmol/g, particularly preferably from 7 to 8.5 mmol/g. A person skilled in the art will know that the content of isocyanate groups in mmol/g and the equivalent weight in g/equivalent are inversely proportional. The content of isocyanate groups in mmol/g can be derived from the content in % by weight in accordance with ASTM D-5155-96 A.

In a particularly preferred embodiment, the component A) comprises at least one polyfunctional isocyanate selected from among diphenylmethane 4,4'-diisocyanate, diphenylmethane 2,4'-diisocyanate, diphenylmethane 2,2'-diisocyanate and oligomeric diphenylmethane diisocyanate. In this preferred embodiment, the component (a1) particularly preferably comprises oligomeric diphenylmethane diisocyanate and has a functionality of at least 2.4.

The viscosity of the component A) used can vary within a wide range. The component A) preferably has a viscosity of from 100 to 3000 mPa*s, particularly preferably from 200 to 2500 mPa*s.

Component B

According to the invention, component B) comprises at least one polyfunctional compound which is reactive toward isocyanates. Polyfunctional compounds which are reactive toward isocyanates are those which have at least two hydrogen atoms which are reactive toward isocyanates, in particular at least two functional groups which are reactive toward isocyanates.

The compounds which are used in the component B) preferably have a functionality of from 2 to 8, in particular from 2 to 6. If a plurality of different compounds are used in component B), the weight average functionality of the component B) is preferably from 2.2 to 5, particularly preferably from 2.4 to 4, very particularly preferably from 2.6 to 3.8. For the purposes of the present invention, the weight average functionality is the value which results when the functionality of each compound B) is weighted according to the proportion by weight of this compound in the component B).

Polyether polyols are preferred as compounds B). The term polyether polyol is used synonymously with the term polyetherol and denotes alkoxylated compounds having at least two reactive hydroxyl groups.

Preferred polyether polyols B) have a functionality of from 2 to 8 and have hydroxyl numbers of from 100 mg KOH/g to 1200 mg KOH/g, preferably from 150 to 800 mg KOH/g, in particular from 200 mg KOH/g to 550 mg KOH/g. All hydroxyl numbers in the context of the present invention are determined in accordance with DIN 53240.

In general, the proportion of component B) based on the sum of the components B) to F) is from 40 to 98% by weight, preferably from 50 to 97% by weight, particularly preferably from 60 to 95% by weight.

The polyetherols preferred for component B) can be prepared by known methods, for example by anionic polymerization of one or more alkylene oxides having from 2 to 4 carbon atoms using alkali metal hydroxides such as sodium or potassium hydroxide, alkali metal alkoxides such as sodium methoxide, sodium or potassium ethoxide or potassium isopropoxide, or amine alkoxylation catalysts such as dimethylethanolamine (DMEOA), imidazole and/or imidazole derivatives with addition of at least one starter molecule comprising from 2 to 8, preferably from 2 to 6, reactive hydrogen atoms in bound form or by cationic polymerization using Lewis acids, such as antimony pentachloride, boron fluoride etherate or bleaching earth.

Suitable alkylene oxides are, for example, tetrahydrofuran, 1,3-propylene oxide, 1,2- or 2,3-butylene oxide, styrene oxide and preferably ethylene oxide and 1,2-propylene oxide. The alkylene oxides can be used individually, alternately in succession or as mixtures. Particularly preferred alkylene oxides are 1,2-propylene oxide and ethylene oxide.

Component B) preferably comprises at least one polyether polyol having a hydroxyl number of from 200 to 400 mg KOH/g, in particular from 230 to 350 mg KOH/g, and a functionality of from 2 to 3. The abovementioned ranges ensure good flow behavior of the reactive polyurethane mixture.

In addition, component B) preferably comprises at least one polyether polyol having a hydroxyl number of from 300 to 600 mg KOH/g, in particular from 350 to 550 mg KOH/g, and a functionality of from 4 to 8, in particular from 4 to 6. The abovementioned ranges lead to good chemical crosslinking of the reactive polyurethane mixture.

Possible starter molecules are, for example: water, organic dicarboxylic acids such as succinic acid, adipic acid, phthalic acid and terephthalic acid, aliphatic and aromatic, optionally N-monoalkyl-, N,N- and N,N'-dialkyl-substituted diamines having from 1 to 4 carbon atoms in the alkyl radical, e.g. optionally monoalkyl- and dialkyl-substituted ethylenediamine, diethylenetriamine, triethylenetetramine, 1,3-propylenediamine, 1,3- or 1,4-butylenediamine, 1,2-, 1,3-, 1,4-, 1,5- and 1,6-hexamethylenediamine, phenylenediamines, 2,3-, 2,4- and 2,6-toluenediamine and 4,4'-, 2,4'- and 2,2'-diaminodiphenylmethane. Particular preference is given to the diprimary amines mentioned, for example ethylenediamine.

Further possible starter molecules are: alkanolamines such as ethanolamine, N-methylethanolamine and N-ethylethanolamine, dialkanolamines such as diethanolamine, N-methyldiethanolamine and N-ethyldiethanolamine and trialkanolamines such as triethanolamine, and ammonia.

Preference is given to using dihydric or polyhydric alcohols such as ethanediol, 1,2- and 1,3-propanediol, diethylene glycol (DEG), dipropylene glycol, 1,4-butanediol, 1,6-hexanediol, glycerol, trimethylolpropane, pentaerythritol, sorbitol and sucrose.

In addition, polyester alcohols having hydroxyl numbers of from 100 to 1200 mg KOH/g are possible as compounds in component B).

Preferred polyester alcohols are prepared by condensation of polyfunctional alcohols, preferably diols, having from 2 to 12 carbon atoms, preferably from 2 to 6 carbon atoms, with polyfunctional carboxylic acids having from 2 to 12 carbon atoms, for example succinic acid, glutaric acid, adipic acid, suberic acid, azelaic acid, sebacic acid, decanedicarboxylic acid, maleic acid, fumaric acid and preferably phthalic acid, isophthalic acid, terephthalic acid and the isomeric naphthalenedicarboxylic acids.

Preferred compounds of the component B) also include the chain extenders and crosslinkers which are optionally used concomitantly. The addition of bifunctional chain extenders, trifunctional and higher-functional crosslinkers or optionally mixtures thereof can prove to be advantageous for modifying the mechanical properties. As chain extenders and/or crosslinkers, preference is given to using alkanolamines and in particular diols and/or triols having molecular weights of less than 400, preferably from 60 to 300.

If desired, chain extenders, crosslinkers or mixtures thereof are advantageously used in an amount of from 1 to 20% by weight, preferably from 2 to 5% by weight, based on the weight of the component B).

Further information on the preferred polyether alcohols and polyester alcohols and their preparation may be found, for example, in Kunststoffhandbuch, volume 7 "Polyurethane", edited by Gunter Oertel, Carl-Hanser-Verlag, Munich, $3^{rd}$ edition, 1993.

Component C

According to the invention, the starting components used in the process comprise one or more blowing agents. According to the invention, the component C) comprises at least formic acid. In a preferred embodiment, not only formic acid but also at least one further blowing agent, in particular water, are used in component C).

As blowing agent C), particular preference is given to an aqueous solution of formic acid. Formic acid dissolved in water in a concentration of from 50 to 99% by weight, in particular from 60 to 95% by weight, particularly preferably from 70 to 90% by weight, is particularly preferably used as blowing agent C).

(Aqueous) formic acid reacts with isocyanate groups to form carbon dioxide and carbon monoxide. Since formic acid and water liberate the blowing gas by means of a chemical reaction with the isocyanate groups, they are referred to as chemical blowing agents.

In addition, it is possible to use physical blowing agents such as low-boiling hydrocarbons. Suitable physical blowing agents are, in particular, liquids which are inert toward the polyisocyanates A) and have boiling points below 100° C., preferably below 50° C., at atmospheric pressure and therefore vaporize under the action of the exothermic polyaddition reaction.

Examples of such liquids which are preferably concomitantly used are alkanes, such as heptane, hexane, n-pentane and isopentane, preferably industrial mixtures of n-pentanes and isopentanes, n-butane and isobutane and propane, cycloalkanes such as cyclopentane and/or cyclohexane, ethers such as furan, dimethyl ether and diethyl ether, ketones such as acetone and methyl ethyl ketone, alkyl carboxylates such as methyl formate, dimethyl oxalate and ethyl acetate and halogenated hydrocarbons such as methylene chloride, dichloromonofluoromethane, difluoromethane, trifluoromethane, difluoroethane, tetrafluoroethane, chlorodifluoroethanes, 1,1-dichloro-2,2,2-trifluoroethane, 2,2-dichloro-2-fluoroethane and heptafluoropropane. Mixtures of these low-boiling liquids with one another and/or with other substituted or unsubstituted hydrocarbons can also be concomitantly used. Further suitable blowing agents are organic carboxylic acids such as acetic acid, oxalic acid, ricinoleic acid and carboxyl-comprising compounds. The additional blowing agents are preferably selected from the group consisting of alkanes and cycloalkanes having at least 4 carbon atoms, dialkyl ethers, esters, ketones, acetals, fluoroalkanes having from 1 to 8 carbon atoms and tetraalkylsilanes having from 1 to 3 carbon atoms in the alkyl chain, in particular tetramethylsilane. Further suitable blowing agents are fluoroalkanes which are degraded in the troposphere and therefore do not damage the ozone layer, e.g. trifluoromethane, difluoromethane, 1,1,1,3,3-pentafluorobutane, 1,1,1,3,3-pentafluoropropane, 1,1,1,2-tetrafluoroethane, difluoroethane and heptafluoropropane and also hydrofluoroolefins (HFO).

Preference is given to not using any halogenated hydrocarbons as blowing agents. Pentanes or mixtures of pentane isomers are preferably used as additional constituents of the component C).

The blowing agents are either dissolved completely or partly in the polyol component (i.e. B+C+D+E+F) or are introduced via a static mixer immediately before foaming of the polyol component. Formic acid/water mixtures or formic acid are preferably completely or partly dissolved in the polyol component. The physical blowing agent (for example pentane) and optionally part of the chemical blowing agent are optionally metered in "on-line".

The amount of component C) used is from 1 to 45% by weight, preferably from 1 to 30% by weight, particularly preferably from 2 to 15% by weight, in each case based on the weight of the components B) to F).

If exclusively formic acid or a formic acid/water mixture serves as blowing agent, the proportion of component C) in the weight of components B) to F) is preferably from 0.5 to 10% by weight, in particular from 1 to 8% by weight, particularly preferably from 2 to 6% by weight.

The addition of the formic acid and optionally water can be carried out in combination with the use of the other blowing agents described. In an embodiment, formic acid or a formic acid/water mixture is used in combination with pentane, in particular cyclopentane and/or n-pentane.

Component D

The reaction to form the rigid polyurethane foam is preferably carried out in the presence of one or more flame retardants.

As flame retardants D), it is generally possible to use the flame retardants known from the prior art. Suitable flame retardants are, for example, brominated esters, brominated ethers (Ixol) or brominated alcohols such as dibromoneopentyl alcohol, tribromoneopentyl alcohol and PHT-4-diol and also chlorinated phosphates such as tris(2-chloroethyl) phosphate, tris(2-chloropropyl)phosphate (TCPP), tris(1,3-dichloropropyl)phosphate, tricresyl phosphate, tris(2,3-dibromopropyl)phosphate, tetrakis(2-chloroethyl) ethylenediphosphate, dimethyl methanephosphonate, diethyl diethanolaminomethylphosphonate and also commercial halogen-comprising flame retardant polyols. As further phosphates or phosphonates, it is possible to use diethyl ethanephosphonate (DEEP), triethyl phosphate (TEP), dimethyl propylphosphonate (DMPP), diphenyl cresyl phosphate (DPC) as liquid flame retardants.

Apart from the abovementioned flame retardants, it is also possible to use inorganic or organic flame retardants such as red phosphorus, preparations comprising red phosphorus, aluminum oxide hydrate, antimony trioxide, arsenic oxide, ammonium polyphosphate and calcium sulfate, expandable graphite or cyanuric acid derivatives such as melamine or mixtures of at least two flame retardants, e.g. ammonium polyphosphates and melamine and optionally maize starch or ammonium polyphosphate, melamine, expandable graphite and optionally aromatic polyesters for making the rigid polyurethane foams flame-resistant.

Preferred flame retardants do not have any groups which are reactive toward isocyanate groups. The flame retardants are preferably liquid at room temperature. Particular preference is given to TCPP, DEEP, TEP, DMPP and DPC.

For the purposes of the present invention, the flame retardants are preferably used in an amount of from 0 to 65% by weight, preferably from 5 to 60% by weight, particularly preferably from 5 to 50% by weight, in particular from 6 to 15% by weight, based on the total weight of the components B) to F).

Component E

The reaction to form the rigid polyurethane foam is preferably carried out in the presence of one or more catalysts.

Catalysts E) used for producing the rigid polyurethane foams are, in particular, compounds which strongly accelerate the reaction of the compounds comprising reactive hydrogen atoms, in particular hydroxyl groups, in the components B) to F) with the polyisocyanates A).

Use is advantageously made of basic polyurethane catalysts, for example tertiary amines such as triethylamine, tributylamine, dimethylbenzylamine, dicyclohexylmethylamine, dimethylcyclohexylamine, bis(N,N-dimethylaminoethyl)ether, bis(dimethylaminopropyl)urea, N-methylmorpholine or N-ethylmorpholine, N-cyclohexylmorpholine, N,N,N',N'-tetramethyl-ethylenediamine, N,N,N,N-tetramethylbutanediamine, N,N,N,N-tetramethylhexane-1,6-diamine, pentamethyldiethylenetriamine, bis(2-dimethylaminoethyl)ether, dimethylpiperazine, N-dimethylaminoethylpiperidine, 1,2-dimethylimidazole, 1-azabicyclo[2.2.0]octane, 1,4-diazabicyclo[2.2.2]octane (Dabco) and alkanolamine compounds such as triethanolamine, triisopropanolamine, N-methyldiethanolamine and N-ethyldiethanolamine, dimethylamino-ethanol, 2-(N,N-dimethylaminoethoxy)ethanol, N,N',N"-tris(dialkylaminoalkyl)hexahydrotriazines, e.g. N,N',N"-tris(dimethylaminopropyl)-s-hexahydrotriazine, and triethylenediamine. However, metal salts such as iron(II) chloride, zinc chloride, lead octoate and preferably tin salts such as tin dioctoate, tin diethylhexanoate and dibutyltin dilaurate and in particular mixtures of tertiary amines and organic tin salts are also suitable.

Further possible catalysts are: amidines such as 2,3-dimethyl-3,4,5,6-tetrahydropyrimidine, tetraalkylammonium hydroxides such as tetramethylammonium hydroxide, alkali metal hydroxides such as sodium hydroxide and alkali metal alkoxides such as sodium methoxide and potassium isopropoxide, alkali metal carboxylates and also alkali metal salts of long-chain fatty acids having from 10 to 20 carbon atoms and optionally lateral OH groups. Preference is given to using from 0.001 to 10 parts by weight of catalyst or catalyst combination, based on (i.e. calculated for) 100 parts by weight of the component B). It is also possible to allow the reaction to proceed without catalysis. In this case, the catalytic activity of amine-initiated polyols is exploited.

If a large excess of polyisocyanate is used for foaming, further possible catalysts for the trimerization reaction of the excess NCO groups with one another are: catalysts which form isocyanurate groups, for example ammonium salts or alkali metal salts, especially ammonium or alkali metal carboxylates, either alone or in combination with tertiary amines. Isocyanurate formation leads to particularly flame-resistant PIR foams.

Further information on the abovementioned and further starting materials may be found in the specialist literature, for example Kunststoffhandbuch, volume VII, Polyurethane, Carl Hanser Verlag, Munich, Vienna, $1^{st}$, $2^{nd}$ and $3^{rd}$ edition 1966, 1983 and 1993.

Component F

The reaction can additionally be carried out using further auxiliaries or additives.

Mention may be made by way of example of surface-active substances, foam stabilizers, cell regulators, fillers, dyes, pigments, hydrolysis inhibitors, fungistatic and bacteriostatic substances.

Possible surface-active substances are, for example, compounds which serve to aid the homogenization of the starting materials and are optionally also suitable for regulating the cell structure of the polymers. Mention may be made by way of example of emulsifiers such as the sodium salts of castor oil sulfates or of fatty acids and also salts of fatty acids with amines, e.g. diethylamine oleate, diethanolamine stearate, diethanolamine ricinoleate, salts of sulfonic acids, e.g. alkali metal or ammonium salts of dodecylbenzenesulfonic or dinaphthylmethanedisulfonic acid and ricinoleic acid; foam stabilizers such as siloxane-oxyalkylene copolymers and other organopolysiloxanes, ethoxylated alkylphenols, ethoxylated fatty alcohols, paraffin oils, castor oil esters or ricinoleic esters, Turkey red oil and peanut oil, and cell regulators such as paraffins, fatty alcohols and dimethylpolysiloxanes. The above-described oligomeric acrylates having polyoxyalkylene and fluoroalkane radicals as side groups are also suitable for improving the emulsifying action, the cell structure and/or stabilizing the foam. The surface-active substances are usually employed in amounts of from 0.01 to 10 parts by weight, based on (i.e. calculated for) 100 parts by weight of the component B).

For the purposes of the present invention, fillers, in particular reinforcing fillers, are the customary organic fillers, reinforcing materials, weighting agents, agents for improving the abrasion behavior in paints, coating compositions, etc. Possible organic fillers are, for example: carbon, melamine, rosin, cyclopentadienyl resins and graft polymers and also cellulose fibers and polyamide, polyacrylonitrile, polyurethane, polyester fibers based on aromatic and/or aliphatic dicarboxylic esters and in particular carbon fibers.

The organic fillers can be used individually or as mixtures and are advantageously added to the reaction mixture in amounts of from 0.5 to 50% by weight, preferably from 1 to 40% by weight, based on the weight of the components A) to F), although the content of mats, nonwovens and woven fabrics composed of natural and synthetic fibers can reach values of up to 80% by weight, based on the weight of the components A) to F).

Further information on the abovementioned other customary auxiliaries and additives may be found in the specialist literature, for example the Monograph by J. H. Saunders and K. C. Frisch "High Polymers" volume XVI, Polyurethanes, Parts 1 and 2, Interscience Publishers 1962 and 1964, or Kunststoff-Handbuch, volume 7: "Polyurethane", Carl-Hanser-Verlag, Munich, $3^{rd}$ edition, 1993.

To produce the rigid polyurethane foams, the polyisocyanates A) and the polyol component B) to F) are preferably reacted in such amounts that the isocyanate index is in the range from 90 to 700, preferably from 100 to 500.

The rigid polyurethane foams used according to the invention are usually produced by the two-component process. In this process, the components B) to F) are mixed to form the polyol component and this is reacted with the polyisocyanates A).

The starting components are usually mixed at a temperature of from 15 to 35° C., preferably from 20 to 30° C. The reaction mixture can be introduced into the composite profiles by means of high- or low-pressure metering machines.

The rigid polyurethane foams used for the process of the invention surprisingly display no bloating of the rigid polyurethane foam on application of a surface coating. In addition, the profiles can be readily processed and display good use properties even at subzero temperatures.

The invention is illustrated by the following examples.

The following polyols were used:

Polyol B-1: polyether polyol having a hydroxyl number of 490 mg KOH/g and based on propylene oxide and sorbitol as starter Polyol B-2: polyether polyol having a hydroxyl number of 248 mg KOH/g and based on propylene oxide and propylene glycol as starter Component C-1: formic acid 85%
Component C-2: water
Compound D-1: tris(2-chloroisopropyl)phosphate
Compound E-1: N,N-dimethylcyclohexylamine
Compound F-1: silicone-based stabilizer, Niax Silicone L-6900

The components shown in table 1 were mixed to form a polyol component.

TABLE 1

| Component | Example 1 | Example 2 |
|---|---|---|
| | Amount used [% by weight] | |
| B-1 | 37.1 | 36.5 |
| B-2 | 36.5 | 38.5 |
| C-1 | 4.5 | — |
| C-2 | — | 3.7 |
| D-1 | 19.0 | 19.0 |
| F-1 | 1.7 | 1.7 |
| E-1 | 1.2 | 0.6 |

A mixture of diphenylmethane 2,4'- and 4,4'-diisocyanate with higher-functional oligomers and isomers (crude MDI) having an NCO content of 31.5% (IsoPMDI 92410 from BASF) was used as isocyanate component. The foaming experiments on the laboratory scale were carried out at an isocyanate index of 115.

In production experiments, polyol and isocyanate components were reacted in a low-pressure plant at an isocyanate index of 115 and used to fill aluminum-polyamide composite profiles having a height of 70 mm and a width of 250 mm with foam. These profiles were then subsequently subjected to powder coating.

Furthermore, aluminum-polyamide composite profiles having a height of 3 cm and a width of 6 cm were manufactured using the rigid polyurethane foams described and subjected to powder coating at 200° C.

In the case of example 1, the profile displayed no deformation even after surface coating.

In contrast, when aluminum-polyamide composite profiles were filled with various filler-free foam formulations using water as blowing agent, both on the laboratory scale and on the production scale, deformation of the completely foam-filled composite elements was observed, especially as a result of surface coating (example 2).

Furthermore, formulations comprising formic acid as blowing agent and comprising increasing amounts of calcium carbonate (calcium carbonate content of 0-50% by weight) were tested in laboratory and production experiments. Here, the incorporation of finely divided fillers into the reaction mixture placed severe demands on the wear resistance of the metering pumps. The corresponding formulations were tested with increasing low-temperature flexibility. Furthermore, the undesirable increase in dust after cutting or sawing of completely foam-filled hollow chamber profiles was in many cases observed in the manufacturing process. In addition, the increase in density of the finished filler-comprising polyurethane foam is disadvantageous in many cases.

The invention claimed is:

1. A process for producing a composite profile, comprising:
    introducing starting components of rigid polyurethane foam into a hollow space formed by at least two metal shells to obtain the rigid polyurethane foam, and
    subsequently applying a surface coating to an outer surface of the composite profile by powder coating or baking enamel,
    wherein:
    the composite profile comprises the at least two metal shells joined by struts,
    the struts comprise a thermoplastic material and a core comprising the rigid polyurethane foam, and
    the starting components of the rigid polyurethane foam comprise:
    A) a polyisocyanate,
    B) a polyfunctional compound which is reactive toward isocyanates,
    C) a blowing agent comprising at least formic acid,
    D) optionally a flame retardant,
    E) optionally a catalyst,
    F) optionally further auxiliaries or additives, and
    no inorganic fillers.

2. The process according to claim 1, wherein component C) is an aqueous solution of formic acid.

3. The process according to claim 2, wherein component C) is a solution of from 70 to 95% by weight of formic acid in water.

4. The process according to claim 1, wherein an amount of formic acid based on a total weight of components B) to F) is from 2 to 6% by weight.

5. The process according to claim 1, wherein component B) comprises exclusively compounds which are obtained by alkoxylation of a starter by exclusively propylene oxide.

6. The process according to claim 1, wherein component B) comprises a polyether polyol having a hydroxyl number of from 200 to 400 mg KOH/g and a functionality of from 2 to 3.

7. The process according to claim 1, wherein component B) comprises a polyether polyol having a hydroxyl number of from 300 to 600 mg KOH/g and a functionality of from 4 to 8.

8. The process according to claim 1, wherein a weight average functionality of component B) is from 2.4 to 5.

9. The process according to claim 1, wherein the surface coating is applied at a temperature of from 100 to 250° C.

10. The process according to claim 1, wherein the starting components of the rigid polyurethane foam comprise:
    A) a polyisocyanate,
    B) a polyfunctional compound which is reactive toward isocyanates,
    C) a blowing agent comprising at least formic acid,
    D) a flame retardant,
    E) a catalyst,
    F) optionally further auxiliaries or additives, and
    no inorganic fillers.

* * * * *